United States Patent [19]
Wilson

[11] Patent Number: 6,112,856
[45] Date of Patent: Sep. 5, 2000

[54] HELICOPTER DRIP PAN

[76] Inventor: Thomas Gray Wilson, 359 Rice Hill School Rd., McKee, Ky. 40447

[21] Appl. No.: 09/069,920

[22] Filed: Apr. 30, 1998

[51] Int. Cl.$^7$ .................................................... F16N 31/00
[52] U.S. Cl. .......................................................... 184/106
[58] Field of Search .............................. 184/106; 277/598

[56] References Cited

U.S. PATENT DOCUMENTS

| | | | |
|---|---|---|---|
| 2,475,836 | 7/1949 | Henricksen et al. ..................... | 184/106 |
| 3,971,511 | 7/1976 | Casey .................................. | 237/12.3 A |
| 4,394,853 | 7/1983 | Lopez-Crevillen et al. ........ | 123/195 C |
| 5,018,407 | 5/1991 | Hoecht .................................... | 184/6.12 |
| 5,411,116 | 5/1995 | Kish et al. ............................. | 184/6.12 |
| 5,544,632 | 8/1996 | Choate ................................. | 123/195 C |

*Primary Examiner*—David Fenstermacher
*Attorney, Agent, or Firm*—Wood, Herron & Evans, L.L.P.

[57] ABSTRACT

A helicopter drip pan apparatus for use with a helicopter structural opening has a cover plate with a frame having an inner lip. A drip pan rests upon and conforms to the inner lip of the frame of the cover plate. The cover plate attaches to an adapter plate which is then affixed to the helicopter structural opening. The helicopter drip pan apparatus covers and seals the helicopter structural opening which provides access to the rotor transmission of the helicopter.

10 Claims, 4 Drawing Sheets

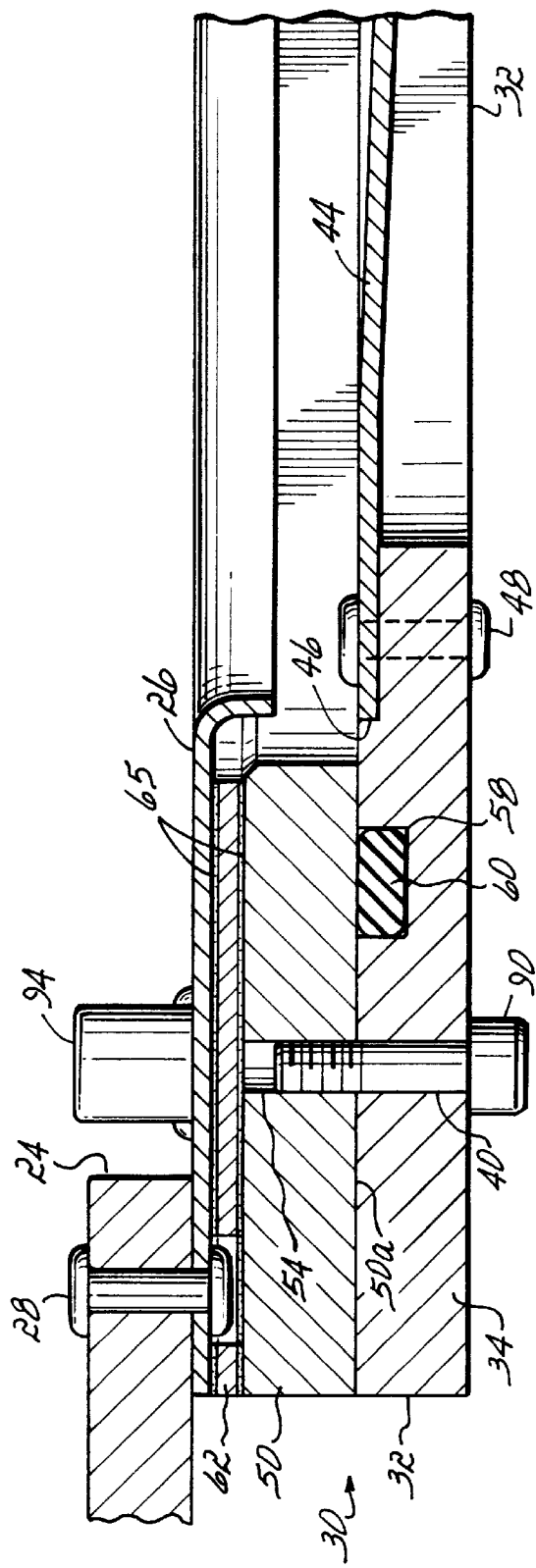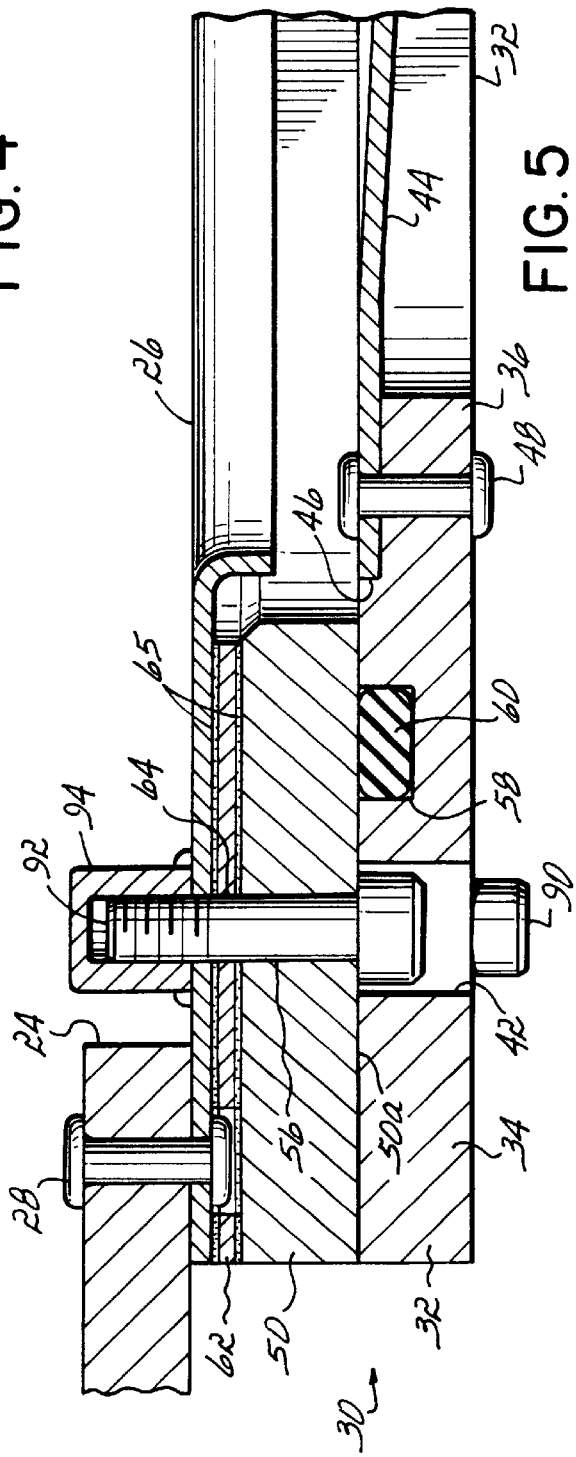

HELICOPTER DRIP PAN

FIELD OF THE INVENTION

This invention relates to a fluid-tight drip pan, and more specifically to a fluid-tight drip pan for the engine compartment of a helicopter.

BACKGROUND OF THE INVENTION

Helicopters, in general, have the same basic configuration or layout. For instance, a typical helicopter will have a cabin section which is used to transport people, cargo or both. In addition, the helicopter will have an engine compartment which is located typically above and to the rear of the cabin section. The engine compartment will house two primary components, at least one engine and a rotor transmission with a corresponding transmission housing.

Both the engine and the rotor transmission contain numerous fluids, such as petroleum-based lubricants, that are critical to the operation of the engine and the transmission. These fluids inevitably leak from various locations in the engine and the transmission during both the operation and storage of the helicopter. Because the engine compartment is generally oriented above the cabin section, any leaking fluids eventually seep or drip into the cabin section, unless proper sealing mechanisms are in place. The inflow of these leaking fluids spoil, stain or damage the cabin's interior materials such as seat covers and acoustic linings. In addition, the leaking fluids can severely damage or destroy sensitive electronic equipment that may be placed in the cabin section of, for instance, a BLACKHAWK™ helicopter.

Moreover, the exterior of the helicopter around the engine and transmission compartment is not completely watertight, allowing water to leak from these areas into the cabin with similar adverse effects.

During routine inspection and maintenance it is necessary to have ready access to the engine and the rotor transmission. Such access is required to check critical fluid levels, to replace worn or damaged parts, or to adjust mechanical systems. Typically, various access panels in or around the engine compartment provide the requisite openings to achieve ready access to the engine and the rotor transmission. In some helicopters, such as the BLACKHAWK™ helicopter, a forged airframe structure forms an access opening which is located below the rotor transmission housing and above the cabin section. The opening is thus accessible through the cabin's ceiling. This access opening, however, must be sealed by a cover against the inevitable oil and fluid drippings which the engine and the rotor transmission will produce, as well as against water leakage.

The access opening below the engine compartment in the BLACKHAWK™ helicopter is defined by both the aircraft structural forgings and a flexible or yieldable downwardly-turned skirt which is riveted onto the helicopter's forged structure. The skirt is thin and many times more flexible relative to the helicopter's forged structure.

Prior drip pan designs attached a covering plate directly to the flexible skirt with a hollow seal sandwiched therebetween. One hollow seal used in prior designs resembled the flexible, hollow door seals used around car doors or refrigerator doors. However, the skirt contains surface aberrations, such as the protruding rivet heads from the rivets securing the skirt to the forged helicopter structure. When the seal engaged both the skirt and the rivet heads, it could be upset enough so that leakage occurred. Accordingly, the hollow seal traversing these aberrations while sandwiched between the skirt and the covering plate is unable to provide a suitable, consistent, long-term fluid seal. Moreover, flexing of the flexible skirt could also cause leakage.

Also, the geometry of the cover cannot be such that it protrudes significantly into the interior of the cabin section. Headroom in the cabin section typically is limited and any additional protrusion from the ceiling of the cabin section is undesirable. In addition, because weight is critical to the operation of any aircraft, heavy cover constructions are undesirable.

Accordingly, one objective of this invention is to provide an improved cover and seal for the interior access opening of helicopters such as the BLACKHAWK™ helicopter and those of similar structure.

Another object of this invention is to provide a drip pan that will effectively and consistently seal fluid from passage from an engine or transmission compartment to a cabin section of a helicopter.

Another object of this invention is to provide a drip pan which permits quick access to the engine or transmission compartment of a helicopter without requiring modification to the existing aircraft structure.

Another objective of the invention is to more effectively seal a drip pan to the skirt defining a transmission access opening in a BLACKHAWK™ helicopter.

Still another object of this invention is to provide a drip pan that can be attached to the existing structure of a BLACKHAWK™ helicopter without modification of the existing airframe structure and with minimal intrusion into the helicopter's cabin section.

SUMMARY OF THE INVENTION

These and other objects of the invention are provided for by a helicopter drip pan apparatus which covers and effectively seals a structural opening in the helicopter defined by a flexible skirt and without leakage at aberrations of the skirt surface. According to one embodiment of the invention, a fluid tight seal is achieved by redefining an aberration-free surface with which a sealing mechanism can be used. To this end and in accordance with one aspect of the present invention, a relatively rigid adapter plate, many times more rigid than that of the flexible skirt, is attached and sealed to the flexible skirt surface but around and not including the rivets holding the skirt in place. Interposed between the flexible skirt and the rigid adapter plate is a gasket to both sides of which a sealant is applied, providing an effective and consistent fluid seal at that interface. Moreover, a further sealing surface can now be formed in the adaptor plate for the cover plate described below. By using an adapter plate sealed to the flexible skirt, an aberration-free, planar sealing surface can be defined in parts other than the skirt. To this end, a cover plate constitutes a frame having an inner lip upon which a drip pan member conforms and rests. An O-ring is oriented in a groove in either the adapter plate or cover plate, and the cover plate frame is attached to the aberration-free surface of the rigid adapter plate to cover and seal the structural opening. Thus a more permanent leak-free seal is produced between the adaptor plate and skirt while a sealing surface for the cover plate is defined on the adaptor plate.

In accordance with another aspect of the present invention, access holes in the drip pan apparatus provide ready access to the rotor transmission during routine servicing. Removable covers sealingly engage the access holes each of which contain an O-ring. Furthermore, the fluid collected by the drip pan member is carried away by a drain tube attached to a drain hole located in the drip pan.

Accordingly, the drip pan apparatus is more permanently sealed to the opening defining skirt and a more effective seal is oriented between components of the drip pan (i.e. adaptor plate and cover plate), to produce an effective and consistent long-life seal without the afore-mentioned vagaries of the less consistent hollow seal alone acting on the flexible skirt and its aberrations.

BRIEF DESCRIPTION OF THE DRAWINGS

FIG. 4 is a cross-sectional view taken along lines 4—4 of FIG. 2 showing the drain pan apparatus in one assembled mode;

FIG. 5 is a cross-sectional view taken along lines 5—5 of FIG. 2 showing the drain pan apparatus in an assembled mode.

DETAILED DESCRIPTION OF THE INVENTION

Figure 1:
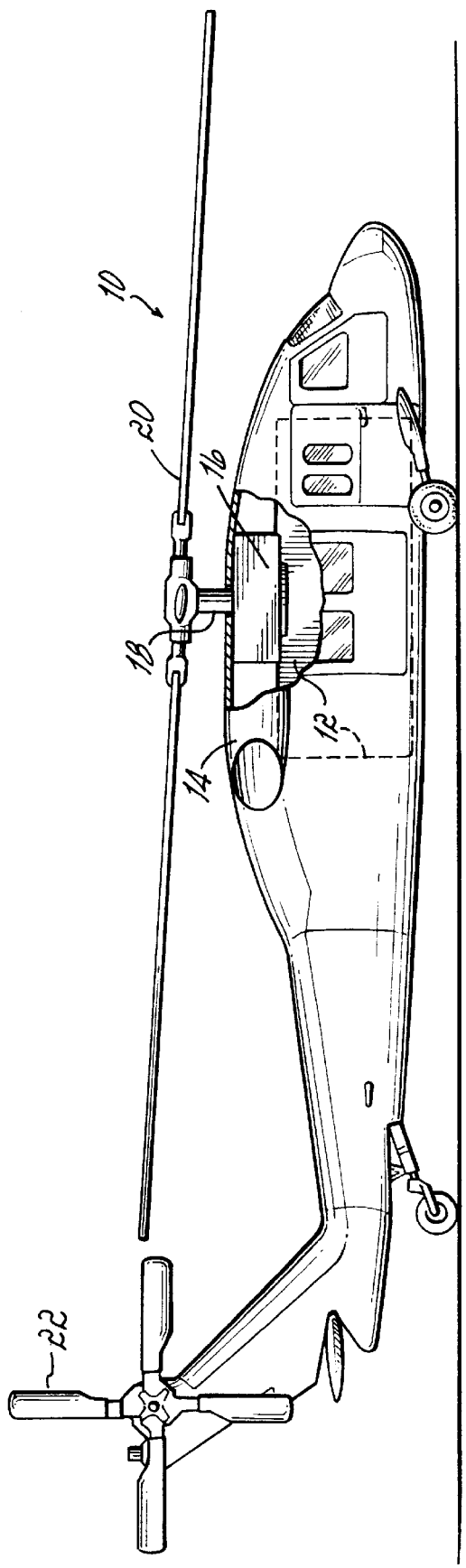
FIG. 1 is a diagrammatic elevational illustration in partial cross section showing orientation of a helicopter, engine, transmission, rotor, and cabin of the type with which the invention is used.

FIG. 1 shows a widely known configuration of a typical helicopter 10. While the typical helicopter 10, for example, in this description is a "Blackhawk" helicopter as manufactured for the United States by Sikorsky Aircraft Company, Stratton, Conn., it will be appreciated that the invention is useful for numerous aircraft and helicopter configurations of other makes and models. In this configuration the helicopter 10 has a cabin 12 (dashed outline) in which passengers, equipment and cargo can ride during operation. Located just above the cabin 12 is at least one engine 14 which supplies power to a rotor transmission 16. The rotor transmission 16 is connected to a shaft 18 which imparts rotary motion to the main rotor 20. The rotor transmission 16 is also connected via a drive shaft (not shown) to a tail rotor 22.

It will be appreciated the rotor transmission 16 requires frequent inspection and maintenance to ensure proper operation of the transmission. To facilitate easy and ready access to the rotor transmission, rotor transmission access openings are provided on both the exterior and interior of the helicopter. For example, structural opening 24 is located within the cabin 12, providing the requisite access to the rotor transmission 16 situated directly above the cabin. Structural opening 24 generally has some type of removable covering to seal the transmission area 16 from the cabin area 12. To accommodate attachment of a removable covering, a flexible skirt 26 (FIG. 2) is fixedly secured around the periphery of structural opening 24 by rivets 28. Skirt 26 is many times more flexible than the structural opening 24 to which it attaches.

Figure 2:
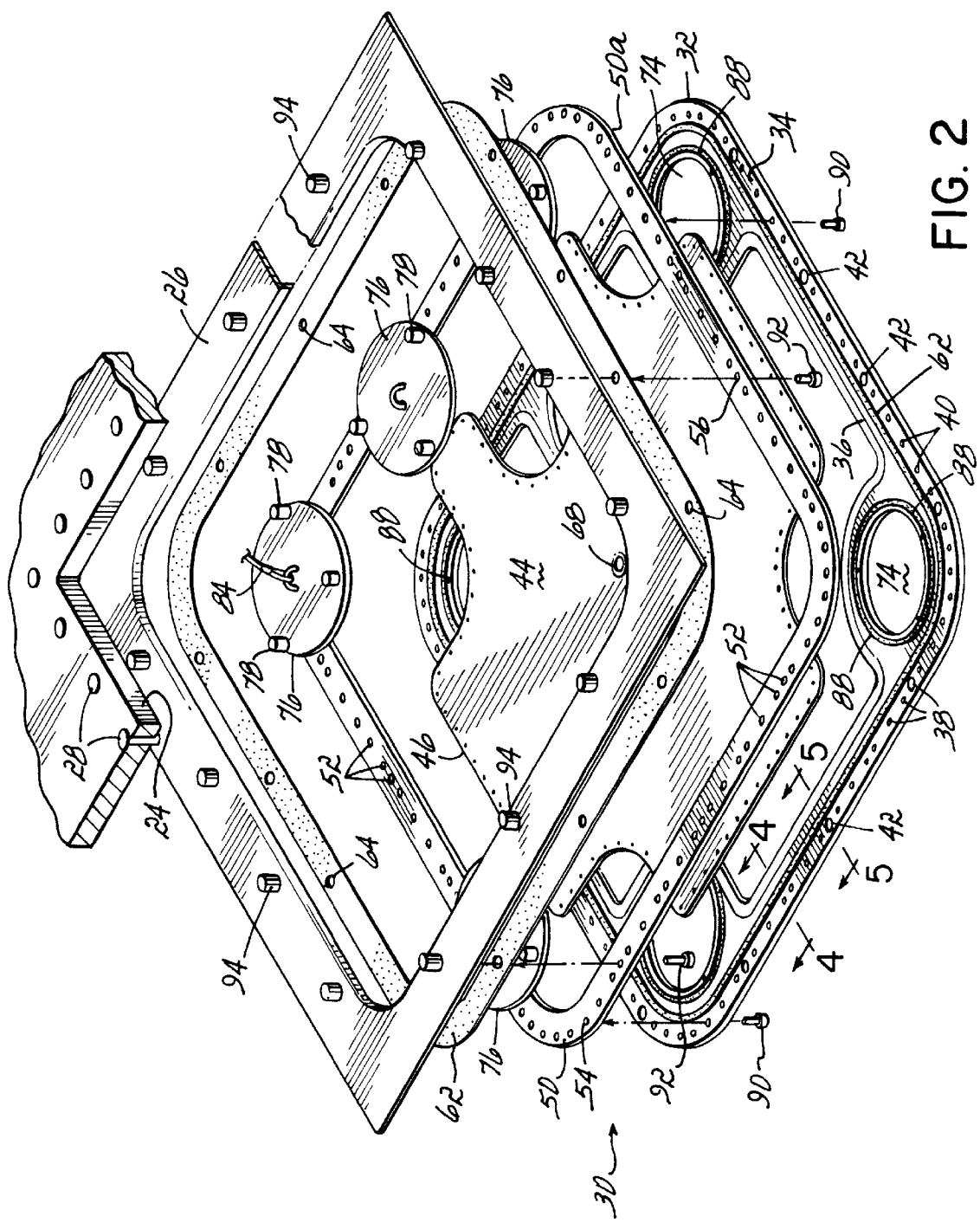
FIG. 2 is a perspective disassembled view of the helicopter drip pan apparatus of the invention with the helicopter skirt shown in a slightly larger scale for clarity.

As can be further appreciated the rotor transmission 16 as well as the engine 14 require various fluids during their respective operations. Generally, these fluids provide the rotor transmission 16 and the engine 14 with lubrication, cooling, and the like. During operation these fluids may leak and drip from either the engine 14 or rotor transmission 16 or both. To prevent leakage of fluid into the cabin 12 via structural opening 24, a drip pan apparatus 30, as shown in FIG. 2, is used to cover and seal the structural opening.

The drip pan apparatus 30 according to one preferred embodiment of the invention has a cover plate 32 including a cover plate frame 34 which has an inner lip 36. The cover plate 32 is at least about 0.125 inches thick, and preferably about 0.375 inches thick. The cover plate 32 has a plurality of throughholes 38 spaced about the cover plate frame 34. Throughholes 38 are a collection of rivet or screw holes 40 and bolt holes 42. Generally, the bolt holes 42 have a larger diameter than the rivet or screw holes 40. The cover plate 32 is provided preferably with eighty-two of the rivet or screw holes 40 and 14 of the bolt holes 42. The cover plate 32 of the drip pan apparatus 30 also has a drip pan 44 which has an outer most edge 46 resting upon and conforming to the inner lip 36 of the cover plate frame 34 of the cover plate 32. The drip pan 44 is permanently affixed to the inner lip 36 of the cover plate 32 by rivets 48 (FIG. 5). The drip pan 44 is made from sheet material having a thickness of at least about 0.031 inches, and preferably about 0.062 inches thick.

In prior drip pan designs a covering plate would be secured directly to the flexible skirt 26 with a sealing member, such as a hollow door seal, sandwiched therebetween. Because of surface aberrations in the flexible skirt 26, including the protruding rivet heads, this configuration provided an unsatisfactory fluid seal. To this end and in accordance with the principles of the present invention, a rigid adapter plate 50 is sealingly attached to the flexible skirt 26 providing a planar, aberration-free surface 50a (FIGS. 4 and 5) to which the cover plate 32 is detachably affixed to form a fluid seal between the adapter plate and the cover plate. Adapter plate 50 is many times more rigid than the flexible skirt 26.

Adaptor plate 50 extends substantially coextensively with the cover plate frame 34. The adapter plate 50 has a plurality of throughholes 52 spaced about the adapter plate 50. Throughholes 52 are a collection of rivet or screw holes 54 and bolt holes 56. Generally, the bolt holes 56 have a larger diameter than the rivet or screw holes 54. The adapter plate 50 is provided preferably with 82 of the rivet or screw holes 54 and 14 of the bolt holes 56. The throughholes 52 are spaced about the adapter plate 50 such that they align with the throughholes 38 spaced about the cover plate 32. The cover plate 32 is attached to and through the adapter plate 50 and to the helicopter structural opening 24 for covering and sealing the opening. Although the various structural components of the drip pan apparatus 30 can be constructed from a variety of materials, it is contemplated that the cover plate 32, the drip pan 44, and the adapter plate 50 will be constructed from aluminum to provide a light-weight and corrosion resistant apparatus.

Adapter plate 50 provides a planar, aberration-free sealing surface 50a to which the cover plate 32 can attach. More advantageously, however, surface 50a is ideally suited for use with an O-ring 60 such that a long-term fluid seal is achieved. To this end cover plate frame 34 includes a groove 58 and an O-ring 60 within the groove, as shown in FIGS. 4 and 5, for sealing engagement with surface 50a of adapter plate 50. As illustrated in FIGS. 4 and 5, groove 58 is positioned in cover plate frame 34 interiorly of throughholes 38. It will be appreciated that a second, additional groove and O-ring could be positioned outside throughholes 38 to provide a seal against fluid that may leak through the throughholes. As can be further appreciated, groove 58 and O-ring 60 could be reversed and located in adapter plate 50 instead of in cover plate frame 34 to provide an equivalent seal between the adapter plate and the cover plate frame.

The sealing effectiveness of the drip pan apparatus 30 is further increased by including a gasket 62 for consistently sealing against fluid flow between the adapter plate 50 and the skirt 26 which is affixed to the structural opening 24. The gasket 62 has a plurality of throughholes 64 spaced about the gasket. Other holes in the gasket accommodate protruding heads of the rivets 28. In addition, a sealant 65 (FIG. 4) can be used for sealing fluid flow between the adapter plate 50 and the gasket 62 and between the gasket and the skirt 26. The sealant can be any commercially available sealing material that upon application provides a seal against fluids between two surfaces. One sealant found useful is Proseal made by Courtaulds Aerospace, Indianapolis, Ind. Such gasket and sealant provide a relatively permanent, leak-free seal which is many times more effective than a hollow seal pressing against the skirt.

This gasket 62 also serves as a spacer, spacing adaptor plate 50 sufficiently away from skirt 26 so sealing is not lost, yet accommodating aberration on the skirt 26 so that an effective, more consistent seal is obtained on the skirt. At the same time, the adaptor plate defines a new, flat sealing surface for cover plate 32.

While the adaptor and cover plate peripheries are shown in FIGS. 4, 5, outside the rivets 28, these peripheries could be drawn in so they were internal of the rivets 28, thereby also avoiding the rivets and sealing disadvantage. In yet a different embodiment, a relief groove could be provided in the adaptor plate beneath rivets 28 so their heads are accommodated by the grooves and gaskets producing a reliable seal.

Figure 3:
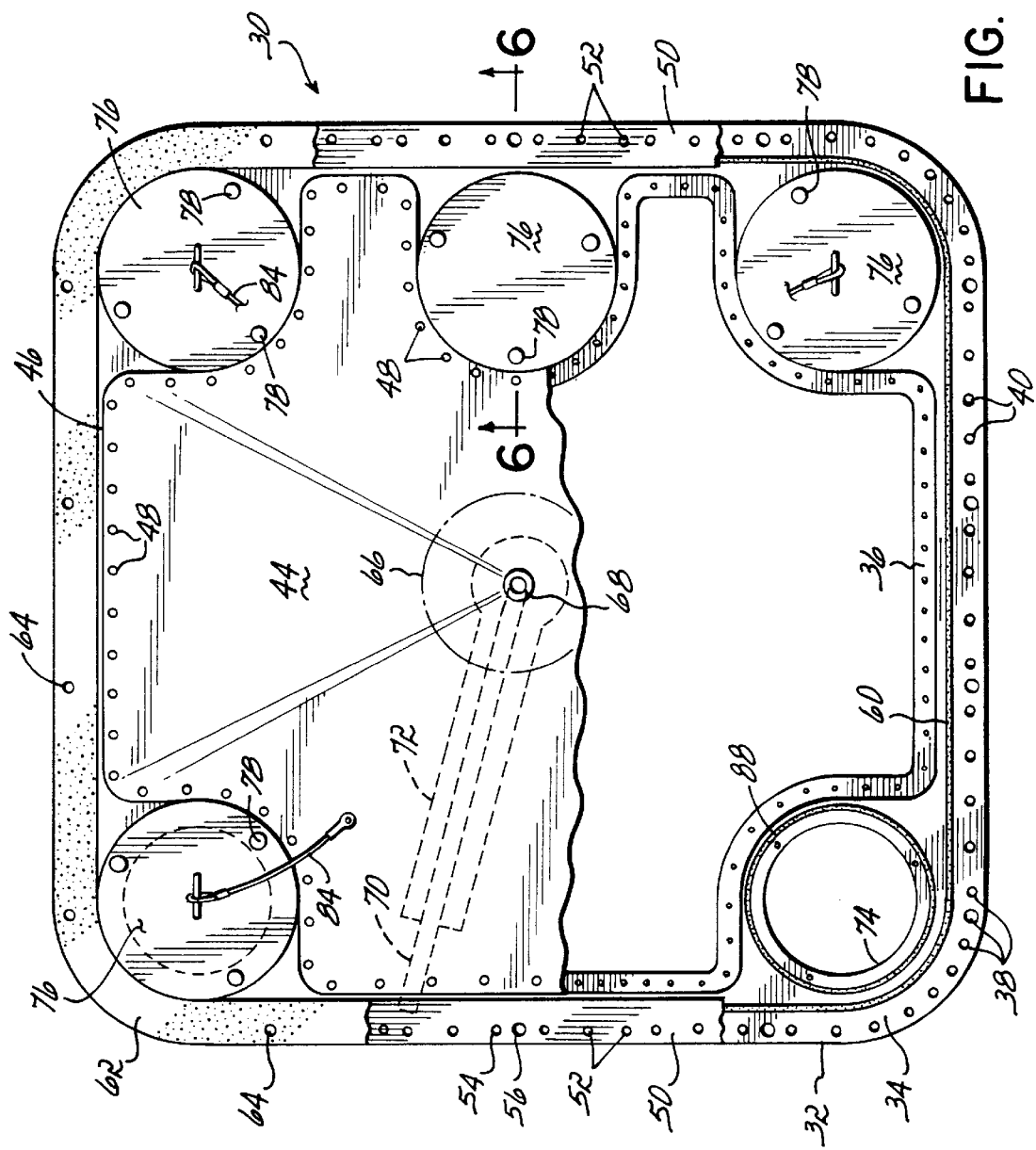
FIG. 3 is a top plan view of the assembled helicopter drain pan apparatus in partial cross section.

With reference to FIG. 3, drip pan 44 has a concave fluid collecting area 66 and a drain hole 68 within the fluid collecting area. A drain tube 70 may be attached to the drain hole 68 in the fluid collecting area 66. The drain tube 70 is made preferably from metal tubing having a diameter of about 0.625 inches. A drain tube cover 72 encases the drain tube 70 and holds the drain tube along the outside surface of the drip pan 44. Alternatively, a removable stopper could be used with drain hole 68 for selective drainage.

Figure 6:
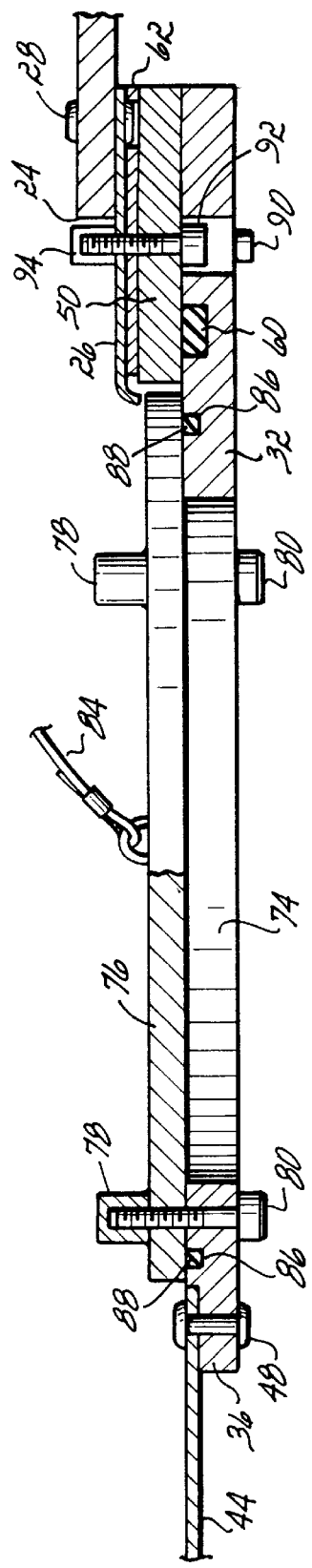
FIG. 6 is a cross-sectional view taken along lines 6—6 of FIG. 3.

Routine maintenance and inspection of the rotor transmission 16, does not ordinarily require removal of the entire drip pan apparatus 30. To accommodate limited access for routine maintenance or inspection, a smaller, removable access cover is provided to allow access to mechanical linkages in and around the rotor transmission and to allow inspection of the fluids associated with the rotor transmission and filter changes. Accordingly, in one embodiment of the drip pan apparatus 30, the cover plate 32 further includes at least one access hole 74 positioned interiorly of the groove 58 as shown in FIGS. 2, 3 and 6. A removable cover 76 for each access hole 74 is removably disposed in sealing engagement covering the hole. To secure the removable cover 76 to the access hole 74 in cover plate frame 34, each removable cover has at least three internally threaded housings or receptacles 78 for receiving a screw 80 (FIG. 6) placed through throughholes 82 (FIG. 6). The removable cover 76 is attached to the drip pan 44 by a suitable attachment device such as a cable or chain 84 so when an inspection procedure is complete the removable cover is readily retrieved and positioned into the access hole 74. Each access hole 74 has a groove 86 in which an O-ring 88 resides as shown in FIG. 6. When the removable cover 76, which has a larger diameter than the access hole 74, is positioned over the access hole, the cover sealingly engages the O-ring 88 to block any fluid flow through the access hole. It is most effective to place the O-ring outside the throughholes 82 shown in FIG. 6 to seal against fluid flow through the throughholes.

While plate 76 is shown above the hole 74 in FIG. 5, it is within the purview of the invention that these plates could be placed under the holes, still covering them in a sealing relationship. In this regard, the housings 78 would be provided on the plate 32 and the O-ring on the bottom side of plate 32 or on the cover 76 itself for sealing against plate 32.

To ensure that the drip pan apparatus 30 functions to prevent fluids from leaking into the helicopter cabin 12, specific installation procedures should be followed. A method for installing the drip pan apparatus 30 to the access opening skirt 26 will have numerous steps. The steps of the installation can be completed in different order and still achieve a functioning drip pan apparatus. One particular installation procedure begins by attaching the cover plate 32, which already has drip pan 44 riveted thereon, to a first side or surface 50a of the adapter plate 50. The cover plate 32 can be attached to the adapter plate 50 by any type of fastening device such as screws 90 or rivets (not shown). A sealant 65 is then applied to both sides of the gasket 62. After applying the sealant to gasket 62, the gasket is then placed onto a second side of the adapter plate 50 such that the holes 56 of the adapter plate align with the holes 64 of the gasket. The adapter plate 50 is then affixed to the access opening skirt 26 by bolts 92 which screw into the internally threaded housings or receptacles 94, with gasket 62 and sealant disposed between the adapter plate 50 and the skirt 26. Receptacles 94 can be welded or riveted onto skirt 26. When riveted (not shown in detail) these rivet heads are not so protruding that they interfere with the sealing gasket 62 or its ability to seal on and around the rivet heads, particularly when a sealant 65 is used.

Accordingly, the invention provides an improved cover and seal for the interior access opening of a helicopter such as the Blackhawk helicopter. As such, the drip pan apparatus of the invention seals against fluid passage from the engine or transmission compartment to the cabin section of a helicopter. In addition, the drip pan apparatus of the invention permits quick access to the engine or transmission compartment of a helicopter, such as the Blackhawk, without requiring modification to the existing aircraft structure It will also be appreciated that the cover plate framed drip pan might be formed of one piece rather than two as described while still providing most benefits of the invention.

These and other embodiments and modifications will become readily apparent to those of ordinary skill in the art without departing from the scope of this invention and the applicant intends to be bound only by the claims appended hereto.

What is claimed is:

1. A helicopter drip pan apparatus for covering and sealing a structural opening in the helicopter defined by a skirt wherein said drip pan apparatus comprises:

a cover plate having a frame, the frame having an inner lip;

a drip pan having an outer most edge resting upon and conforming to the inner lip of the frame of the cover plate; and an adapter plate extending substantially coextensively with and attached to the cover plate frame;

wherein said adapter plate is adapted to seal to said skirt.

2. The helicopter drip pan apparatus of claim 1 including a groove in said frame and an O-ring within the groove for sealing engagement with said adapter plate.

3. The helicopter drip pan apparatus of claim 2 wherein said drip pan apparatus further comprises a gasket for sealing against fluid flow between the adapter plate and the skirt of said helicopter structural opening.

4. The helicopter drip pan apparatus of claim 3 wherein the cover plate further comprises:

at least one access hole positioned interiorly of said groove; and a removable cover for each access hole, said access hole cover being removably disposed in sealing engagement covering the hole.

5. The helicopter drip pan apparatus of claim 3 further comprising a sealant adapted to seal against fluid flow between the adapter plate and the gasket and between the gasket and skirt of said helicopter structural opening.

6. The helicopter drip pan apparatus of claim 3 the drip pan having a concave fluid collecting area and a drain hole in the fluid collecting area.

7. The helicopter drip pan apparatus of claim 6 further comprising a drain tube and a drain tube cover, the drain tube attached to the drain hole in the fluid collecting area of the drip pan, and the drain tube cover encasing the drain tube.

8. The helicopter drip pan apparatus of claim 3 the cover plate having a plurality of throughholes spaced about the frame, and the adapter plate having a plurality of throughholes spaced about a periphery of the adapter plate, where the cover plate holes are aligned with the adapter plate holes.

9. A helicopter structure including in combination a rotor transmission, a rotor transmission access opening having a skirt, and a drip pan apparatus in sealing engagement with the access opening, where the drip pan apparatus comprises:

a cover plate having a frame, the frame having an inner lip;

a drip pan having an outer most edge resting upon and conforming to the inner lip of the frame of the cover plate; and an adapter plate extending substantially coextensively with and attached to the cover plate frame;

wherein said adapter plate is sealed to said skirt of said access opening for covering and sealing said access opening.

10. A method for installing a helicopter drip pan apparatus to a helicopter structure where the helicopter has a rotor transmission, a rotor transmission access opening with a skirt, and a drain pan for covering and sealing said opening, the drain pan comprising a cover plate having a frame, the frame having an inner lip, a drip pan having an outer most edge resting upon and conforming to the inner lip of the frame of the cover plate, an adapter plate extending substantially coextensively with the cover plate frame, and a gasket, the method comprising the steps of:

attaching the cover plate to a first side of the adapter plate applying a sealant to first and second sides of the gasket;

placing the first side of the gasket onto a second side of the adapter plate; and attaching the adapter plate to the access opening skirt sandwiching the gasket therebetween.

\* \* \* \* \*